(12) United States Patent
Awano et al.

(10) Patent No.: US 10,486,391 B2
(45) Date of Patent: Nov. 26, 2019

(54) BONDED STRUCTURE AND METHOD FOR MANUFACTURING THE SAME

(71) Applicant: HONDA MOTOR CO., LTD., Minato-ku, Tokyo (JP)

(72) Inventors: Katsuyuki Awano, Wako (JP); Yasuhiko Saijo, Wako (JP); Yoichi Toyooka, Wako (JP); Masaaki Nishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 15/849,925

(22) Filed: Dec. 21, 2017

(65) Prior Publication Data
US 2018/0178490 A1 Jun. 28, 2018

(30) Foreign Application Priority Data
Dec. 26, 2016 (JP) .................................. 2016-250703

(51) Int. Cl.
*B32B 3/30* (2006.01)
*B32B 15/04* (2006.01)
(Continued)

(52) U.S. Cl.
CPC .................. *B32B 7/12* (2013.01); *B23B 3/30* (2013.01); *B23K 26/352* (2015.10);
(Continued)

(58) Field of Classification Search
None
See application file for complete search history.

(56) References Cited

U.S. PATENT DOCUMENTS 4,122,240 A * 10/1978 Banas ...................... C21D 1/09
428/655
4,746,390 A * 5/1988 Badalec ................ H01L 21/268
156/196
(Continued)

FOREIGN PATENT DOCUMENTS

CN 104149261 A * 11/2014 ............. B29C 65/16
CN 104630872 A * 5/2015 ........... B23K 26/324
(Continued)

OTHER PUBLICATIONS

Machine Translation of EP 829553 A1, Mar. 1998 (Year: 1998).*
(Continued)

*Primary Examiner* — Jeffrey A Vonch
(74) *Attorney, Agent, or Firm* — Amin, Turocy & Watson LLP

(57) ABSTRACT

An amorphous structure layer is formed on a surface layer of a bonded portion of each of side brackets. A bottomed hole layer including a plurality of bottomed holes is formed on a surface layer of the amorphous structure layer. Each of the bottomed holes has a reverse-tapered shape, which has, between an opening portion and a bottom portion of each of the bottomed holes, a bulged portion having a larger inner circumference than the opening portion. An adhesive is injected into the bottomed holes. An outer circumferential surface of the bonded portion of each of the side brackets and an inner circumferential surface of an end portion of a center beam face toward each other with the adhesive interposed therebetween.

5 Claims, 9 Drawing Sheets

(51) Int. Cl.
  *B29C 65/00* (2006.01)
  *B23K 26/352* (2014.01)
  *C09J 5/02* (2006.01)
  *B62D 29/00* (2006.01)
  *B62D 21/11* (2006.01)
  *B32B 7/12* (2006.01)
  *B23B 3/30* (2006.01)
  *B29C 65/54* (2006.01)
  *B29L 31/30* (2006.01)
  *B62D 27/02* (2006.01)
  *B23K 26/324* (2014.01)
  *B23B 3/26* (2006.01)
  *B32B 15/18* (2006.01)
  *B23K 26/00* (2014.01)
  *B23K 103/10* (2006.01)
  *B23K 26/354* (2014.01)
  *B29L 9/00* (2006.01)
  *B29C 65/48* (2006.01)
  *B29C 65/52* (2006.01)

(52) U.S. Cl.
  CPC ........ *B23K 26/355* (2018.08); *B23K 26/3568* (2018.08); *B29C 65/54* (2013.01); *B29C 65/542* (2013.01); *B29C 66/028* (2013.01); *B29C 66/303* (2013.01); *B29C 66/30325* (2013.01); *B29C 66/721* (2013.01); *B29C 66/73162* (2013.01); *B29C 66/73771* (2013.01); *B29C 66/742* (2013.01); *B32B 15/04* (2013.01); *B62D 21/11* (2013.01); *B62D 29/005* (2013.01); *C09J 5/02* (2013.01); *B23B 3/26* (2013.01); *B23K 26/0006* (2013.01); *B23K 26/324* (2013.01); *B23K 26/354* (2015.10); *B23K 2103/10* (2018.08); *B29C 65/48* (2013.01); *B29C 65/52* (2013.01); *B29C 66/112* (2013.01); *B29C 66/43* (2013.01); *B29C 66/73185* (2013.01); *B29C 66/7422* (2013.01); *B29L 2009/003* (2013.01); *B29L 2031/30* (2013.01); *B29L 2031/3002* (2013.01); *B32B 15/18* (2013.01); *B32B 2260/00* (2013.01); *B32B 2305/00* (2013.01); *B32B 2307/702* (2013.01); *B32B 2307/752* (2013.01); *B32B 2310/0806* (2013.01); *B32B 2311/24* (2013.01); *B32B 2605/00* (2013.01); *B62D 27/026* (2013.01); *C09J 2205/31* (2013.01); *C09J 2400/166* (2013.01); *Y10S 148/138* (2013.01); *Y10S 148/903* (2013.01); *Y10T 29/49906* (2015.01); *Y10T 428/24545* (2015.01); *Y10T 428/24612* (2015.01)

(56) References Cited

U.S. PATENT DOCUMENTS

| | | | | |
|---|---|---|---|---|
| 4,806,503 A * | 2/1989 | Yoshida | H01L 24/50 | 257/676 |
| 4,834,806 A * | 5/1989 | Hashimoto | B23K 35/3033 | 148/403 |
| 4,861,407 A * | 8/1989 | Volkmann | B29C 59/16 | 156/272.8 |
| 4,915,980 A * | 4/1990 | Matsunawa | C22F 3/00 | 148/403 |
| 4,931,125 A * | 6/1990 | Volkmann | B29C 59/16 | 156/272.8 |
| 4,968,383 A * | 11/1990 | Volkmann | B29C 59/16 | 216/65 |
| 5,473,138 A * | 12/1995 | Singh | A61F 2/30771 | 219/121.69 |
| 5,499,668 A | 3/1996 | Katayama et al. | | |
| 5,531,950 A * | 7/1996 | Kimura | B29C 37/0078 | 264/135 |
| 6,176,959 B1* | 1/2001 | Clarke | B08B 7/0042 | 156/272.8 |
| 6,348,737 B1* | 2/2002 | Advocate, Jr. | H01L 23/49827 | 257/773 |
| 6,402,476 B1* | 6/2002 | Bossmann | B23K 35/3033 | 416/241 R |
| 6,468,613 B1* | 10/2002 | Kitano | B32B 15/08 | 428/35.8 |
| 6,652,925 B1* | 11/2003 | Schwarz | C23C 24/10 | 427/405 |
| 6,749,254 B1* | 6/2004 | Kleven | B62D 25/105 | 296/191 |
| 2006/0081573 A1* | 4/2006 | Wissenbach | B24B 1/00 | 219/121.66 |
| 2007/0051465 A1* | 3/2007 | Naughton | B29C 65/54 | 156/305 |
| 2009/0056868 A1* | 3/2009 | Basu | B29C 65/4835 | 156/295 |
| 2009/0202840 A1* | 8/2009 | Griebel | C08J 5/128 | 428/423.1 |
| 2009/0280314 A1 | 11/2009 | Mahler et al. | | |
| 2010/0098910 A1* | 4/2010 | Naritomi | B32B 7/12 | 428/141 |
| 2010/0126662 A1* | 5/2010 | Schreiber | B08B 7/0042 | 156/272.6 |
| 2010/0231005 A1 | 9/2010 | Yoshida et al. | | |
| 2010/0258542 A1* | 10/2010 | Meyer | B32B 37/02 | 219/121.66 |
| 2010/0279023 A1* | 11/2010 | Kusinski | C23C 4/08 | 427/455 |
| 2010/0279108 A1* | 11/2010 | Kuroyama | B29C 45/14311 | 428/339 |
| 2010/0279120 A1* | 11/2010 | Naritomi | B29C 45/14311 | 428/413 |
| 2011/0049114 A1* | 3/2011 | Barkhausen | B08B 7/0042 | 219/121.77 |
| 2011/0318585 A1* | 12/2011 | Su | B29C 45/14311 | 428/419 |
| 2012/0003483 A1* | 1/2012 | Salz | B05D 1/62 | 428/447 |
| 2012/0231281 A1* | 9/2012 | Hirai | C09D 1/00 | 428/447 |
| 2013/0068741 A1* | 3/2013 | Pillai | B23K 26/08 | 219/121.85 |
| 2013/0075026 A1* | 3/2013 | Chang | B29C 45/14311 | 156/245 |
| 2013/0078423 A1* | 3/2013 | Sutou | B29C 45/14311 | 428/141 |
| 2013/0272780 A1* | 10/2013 | Takeuchi | C09J 5/06 | 403/270 |
| 2014/0183895 A1* | 7/2014 | Awano | B62D 29/005 | 296/29 |
| 2014/0272429 A1* | 9/2014 | Erickson | B32B 17/1055 | 428/433 |
| 2014/0349137 A1* | 11/2014 | Brandl | B23K 26/123 | 428/687 |
| 2014/0356578 A1* | 12/2014 | Brandl | C22F 1/057 | 428/141 |
| 2014/0363623 A1* | 12/2014 | Sun | C25D 11/08 | 428/119 |
| 2015/0030864 A1* | 1/2015 | Takeuchi | B32B 27/08 | 428/458 |
| 2015/0064409 A1* | 3/2015 | Takeuchi | B32B 15/08 | 428/164 |
| 2015/0079384 A1* | 3/2015 | Zhang | B32B 15/08 | 428/312.8 |
| 2015/0166105 A1* | 6/2015 | Zander | B62D 21/11 | 180/312 |
| 2015/0183185 A1* | 7/2015 | Chang | B32B 15/08 | 428/307.3 |
| 2015/0217545 A1* | 8/2015 | Endo | B29C 45/14311 | 428/472.2 |
| 2015/0306705 A1* | 10/2015 | Bourgois | B23K 26/362 | 156/272.8 |

(56) References Cited

U.S. PATENT DOCUMENTS

| | | | | |
|---|---|---|---|---|
| 2015/0375796 A1* | 12/2015 | Minei | ............... | B62D 27/026 296/29 |
| 2015/0377721 A1* | 12/2015 | Sato | ............... | B23K 26/3584 73/862.621 |
| 2016/0046050 A1* | 2/2016 | Ikeda | ............... | B29C 45/14311 264/478 |
| 2016/0100498 A1* | 4/2016 | Jiao | ............... | B22D 31/002 156/256 |
| 2016/0108484 A1* | 4/2016 | Preston | ............... | C21D 1/04 148/538 |
| 2016/0151993 A1* | 6/2016 | Ikeda | ............... | B23K 26/3584 428/141 |
| 2016/0160371 A1* | 6/2016 | Chang | ............... | C25D 11/246 205/50 |
| 2016/0221254 A1* | 8/2016 | Saito | ............... | B29C 66/24245 |
| 2016/0265570 A1* | 9/2016 | Sabau | ............... | B29C 66/73161 |
| 2016/0303820 A1* | 10/2016 | Takihana | ............... | B32B 15/08 |
| 2016/0347377 A1* | 12/2016 | Minei | ............... | B29C 65/56 |
| 2017/0080984 A1* | 3/2017 | Jung | ............... | B29C 66/304 |
| 2017/0094824 A1* | 3/2017 | Krogdahl | ............... | C25D 11/04 |
| 2017/0136668 A1* | 5/2017 | Kose | ............... | B23K 26/355 |
| 2017/0259468 A1* | 9/2017 | Nishikawa | ............... | B29C 45/14 |
| 2018/0207847 A1* | 7/2018 | Nishikawa | ............... | B29C 45/14 |
| 2018/0369956 A1* | 12/2018 | Anasenzl | ............... | C09J 5/02 |
| 2019/0001441 A1* | 1/2019 | Gu | ............... | B23K 26/324 |

FOREIGN PATENT DOCUMENTS

| | | | | |
|---|---|---|---|---|
| CN | 105377548 | | 3/2016 | |
| DE | 4320408 A1 * | | 12/1994 | ............ B08B 7/0042 |
| DE | 19800035 A1 * | | 7/1999 | ............ B29C 65/601 |
| DE | 19800038 A1 * | | 7/1999 | ............ B21J 15/02 |
| DE | 19930001 A1 * | | 1/2001 | ............ B60J 5/0455 |
| DE | 10024695 A1 * | | 11/2001 | ............ B29C 66/742 |
| DE | 102005056460 A1 * | | 6/2007 | ....... B29C 45/14311 |
| DE | 102007023418 A1 * | | 11/2008 | ............ C23C 4/02 |
| DE | 102015214914 A1 * | | 2/2016 | ............ B32B 7/05 |
| DE | 102015202120 A1 * | | 8/2016 | ............ B32B 5/02 |
| EP | 0488165 A2 * | | 6/1992 | ............ C21D 1/09 |
| EP | 0626228 A1 * | | 11/1994 | ............ B23K 15/08 |
| EP | 0829553 A1 * | | 3/1998 | ............ B23H 9/008 |
| EP | 1854903 A1 * | | 11/2007 | ............ B23K 9/042 |
| EP | 2112359 A1 * | | 10/2009 | ............ C23C 4/02 |
| EP | 2962834 A1 * | | 1/2016 | ............ B29C 65/44 |
| JP | 53141343 A * | | 12/1978 | ............ B29C 65/48 |
| JP | 59085392 A * | | 5/1984 | ....... B29C 37/0082 |
| JP | 63-262213 | | 10/1988 | |
| JP | 01150524 A * | | 6/1989 | ............ B29C 65/4835 |
| JP | 01-225784 | | 9/1989 | |
| JP | 02-185957 | | 7/1990 | |
| JP | 07-171689 | | 7/1995 | |
| JP | 2008087409 A * | | 4/2008 | |
| JP | 2009-096370 | | 5/2009 | |
| JP | 2010-064397 | | 3/2010 | |
| JP | 2010143009 A * | | 7/2010 | |
| JP | 2011-056583 | | 3/2011 | |
| JP | 2012041579 A * | | 3/2012 | |
| JP | 2012-220023 | | 11/2012 | |
| JP | 2012255513 A * | | 12/2012 | ............ B29C 65/48 |
| JP | 2013107273 A * | | 6/2013 | ....... B29C 37/0082 |
| JP | 2013245356 A * | | 12/2013 | |
| JP | 2014-128986 | | 7/2014 | |
| JP | 2014166693 A * | | 9/2014 | ............ B23K 15/08 |
| JP | 2015100959 A * | | 6/2015 | ............ B08B 7/0042 |
| JP | 2016036955 A * | | 3/2016 | ............ B32B 7/05 |
| JP | 2016129942 A * | | 7/2016 | ............ B29C 65/16 |
| JP | 2016141052 A * | | 8/2016 | ............ B23K 26/324 |
| JP | 2016147404 A * | | 8/2016 | ............ B29C 65/16 |
| JP | 2016150375 A * | | 8/2016 | ............ B23K 20/02 |
| WO | WO-8607568 A1 * | | 12/1986 | ............ B29C 59/16 |
| WO | WO-9409969 A1 * | | 5/1994 | ............ B05D 3/06 |
| WO | WO-2005061203 A2 * | | 7/2005 | ............ B05D 7/14 |
| WO | WO-2007072603 A1 * | | 6/2007 | ............ B23K 26/32 |
| WO | WO-2009078373 A1 * | | 6/2009 | ....... B29C 45/14311 |
| WO | WO-2014112506 A1 * | | 7/2014 | ............ B29C 65/02 |
| WO | WO-2018033625 A1 * | | 2/2018 | ....... B29C 66/7394 |

OTHER PUBLICATIONS

Machine Translation of JP 2012255513 A, Feb. 2012 (Year: 2012).*

Hasimoto et al., Laser and electron beam processing of amorphous surface alloys on conventional crystalline metals, Apr. 2007, Materials and Manufacturing Processes, vol. 5, Issue 4 (Year: 2007).*

Virtanen et al., Abstract for "The effect of laser surface modification on the corrosion behaviour of Fe and Al base alloys", Sep. 1994, Corrosion Science, vol. 36, Issue 9 (Year: 1994).*

Watkins et al., Microstructure and corrosion properties of laser surface processed aluminium alloys: a review, Jul. 1997, Materials Science and Engineering, vol. 231, Issues 1-2, pp. 55-61 (Year: 1997).*

CleanLaser, Laser Pre-treatment of Metals, Jun. 2016, Pre-Treatment for Adhesive Bonding and Coating (Year: 2016).*

Hashimoto et al., Abstract for "Corrosion-resistant amorphous surface alloys", 1993 (no month), Corrosion Science, vol. 35, Issues 1-4 (Year: 1993).*

Audebert et al., Production of glassy metallic layers by laser surface treatment, Feb. 2003, Scripta Materialia, vol. 48, Issue 3, pp. 281-286 (Year: 2003).*

Japanese Office Action for Japanese Patent Application No. 2016-250703 dated Jul. 24, 2018.

Chinese Office Action and Search Report for Chinese Patent Application No. 201711434931.2 dated Apr. 25, 2019.

* cited by examiner

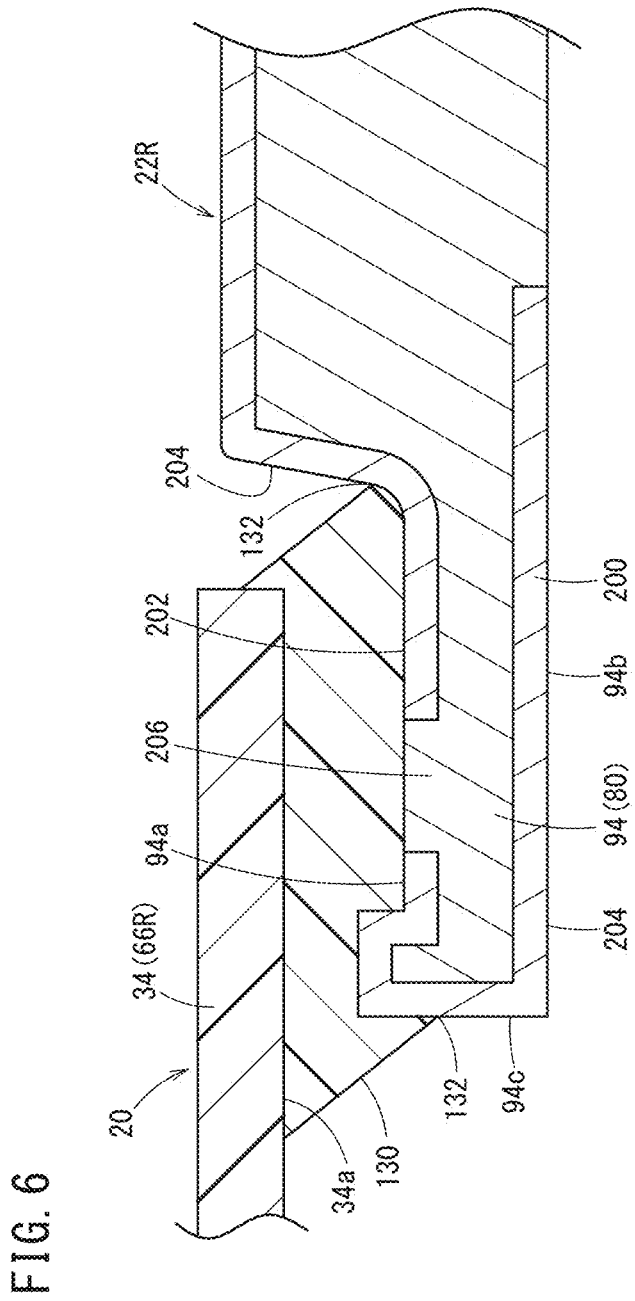

100 μm

BONDED STRUCTURE AND METHOD FOR MANUFACTURING THE SAME

CROSS-REFERENCE TO RELATED APPLICATION

This application is based upon and claims the benefit of priority from Japanese Patent Application No. 2016-250703 filed on Dec. 26, 2016, the contents of which are incorporated herein by reference.

BACKGROUND OF THE INVENTION

Field of the Invention

The present invention relates to a bonded structure containing a first member and a second member bonded to each other with an adhesive or a sealing member, at least one of the first member and the second member being a metal member, and also relates to a method of manufacturing the bonded structure.

Description of the Related Art

Japanese Laid-Open Patent Publication No. 2014-128986 discloses a vehicle subframe made up of a bonded structure containing aluminum and carbon-fiber-reinforced plastic (CFRP) which are bonded to each other with an adhesive. Japanese Laid-Open Patent Publication No. 2011-056583 discloses a composite material laser machining method of filling, with a filler material, a joined portion of welded joint between fiber-reinforced plastic (FRP) and metal, irradiating the filler material with a laser beam to thereby melt the filler material and performing laser welding.

SUMMARY OF THE INVENTION

Rust or corrosion easily occurs on metal members under high humid environment. It is concerned that, when such corrosion or rust intrudes into an interface between the metal member and an adhesive, peeling occurs. Japanese Laid-Open Patent Publication Nos. 2014-128986 and 2011-056583 do not refer to rust-prevention of the metal members. Japanese Laid-Open Patent Publication No. 2014-128986 refers to an adhesion strength of an interface between the metal member and CFRP or FRP, but there is still room for improvement thereof.

The present invention has been made by considering such tasks. An object of the present invention is to provide a bonded structure that contains a metal member whose surface has a rust-prevention function, and can suitably improve bonding strength for a bonding member such as an adhesive, and also provide a method of manufacturing the bonded structure.

According to an aspect of the present invention, there is provided a bonded structure containing a metal member and a fiber-reinforced plastic member bonded to each other with an adhesive, wherein an amorphous structure layer is formed on a surface layer of the metal member, a bottomed hole layer including a plurality of bottomed holes is further formed on a surface layer of the amorphous structure layer, each of the bottomed holes has a reverse-tapered shape, the reverse-tapered shape has, between an opening portion of each of the bottomed holes and a bottom portion thereof, a bulged portion having a larger inner circumference than the opening portion, the adhesive is injected in the bottomed holes, and a surface of the bottomed hole layer and a bonded surface of the fiber-reinforced plastic member face toward each other with the adhesive interposed therebetween.

Corrosion (rust) does not occur in an interface between the amorphous structure layer and the adhesive. Thus, it is possible to realize a rust-prevention function. Since the bottomed holes are formed in the surface layer of the amorphous structure layer, surface areas of the metal members become larger. Further, the bottomed holes having the reverse-tapered shapes not only provide an anchor effect but also prevent running-off of the adhesive from the holes. Consequently, it is possible to improve adhesion strength between the metal members and the adhesive.

Each of the bottomed holes may include a hook portion at the opening portion. The hook portion has an undercut shape, and prevents the adhesive from running off the holes. Consequently, it is possible to improve the adhesion strength of the metal members and the adhesive.

The hook portion may include a head portion, wherein the head portion extends in non-parallel to an extending surface of the metal member and has the length of 100 μm or less. The head portion extends in non-parallel to the extending surface of the metal member, and therefore further prevents running-off of the adhesive from the holes. Thus, it is possible to improve the adhesion strength between the metal members and the adhesive.

According to another aspect of the present invention, there is provided a method of manufacturing a bonded structure that contains a metal member and a fiber-reinforced plastic member bonded to each other with an adhesive, the method including: irradiating the metal member with laser to thereby form an amorphous structure layer on a surface layer of the metal member and form a bottomed hole layer including a plurality of bottomed holes on a surface layer of the amorphous structure layer, each of the bottomed holes having a reverse-tapered shape, wherein the reverse-tapered shape has, between an opening portion and a bottom portion of each of the bottomed holes, a bulged portion having a larger inner circumference than the opening portion; injecting the adhesive into the bottomed holes; and placing a surface of the bottomed hole layer and a bonded surface of the fiber-reinforced plastic member so as to face toward each other with the adhesive interposed therebetween, and bonding the metal member and the fiber-reinforced plastic member together.

Corrosion (rust) does not occur in an interface between the amorphous structure layer and the adhesive. Thus, it is possible to realize a rust-prevention function. Since the bottomed holes are formed in the surface layer of the amorphous structure layer, the surface areas of the metal members become larger. Further, the bottomed holes having the reverse-tapered shapes not only provide an anchor effect but also prevent running-off of the adhesive from the holes. Thus, it is possible to improve the adhesion strength between the metal members and the adhesive.

According to another aspect of the present invention, there is provided a bonded structure containing a first member and a second member bonded to each other with an adhesive or a sealing member, at least one of the first member and the second member being a metal member, wherein an amorphous structure layer is formed on a surface layer of the metal member, a bottomed hole layer including a plurality of bottomed holes is further formed on a surface layer of the amorphous structure layer, each of the bottomed holes has a reverse-tapered shape, wherein the reverse-tapered shape has, between an opening portion and a bottom portion of each of the bottomed holes, a bulged portion having a larger inner circumference than the opening portion, the adhesive is injected in the bottomed holes, and a surface of the bottomed hole layer and a bonded surface of the second member face toward each other with the adhesive or the sealing member interposed therebetween.

Corrosion (rust) does not occur in an interface between the amorphous structure layer and the bonding member such as the adhesive or the sealing member. Thus, it is possible to realize a rust-prevention function. Since the bottomed holes are formed in the surface layer of the amorphous structure layer, the surface areas of the metal members become larger. Further, the bottomed holes having the reverse-tapered shapes not only provide an anchor effect but also prevent running-off of the adhesive from the holes. Consequently, it is possible to improve the bonding strength between the metal members and the bonding member.

The present invention can realize the rust-prevention function. Further, it is possible to improve the bonding strength between the metal members and the bonding member such as the adhesive or the sealing member.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a schematic view of a modification of FIG. 4;

DESCRIPTION OF THE PREFERRED EMBODIMENTS

1. Configuration of Subframe 12 (Bonded Structure)

Figure 1:
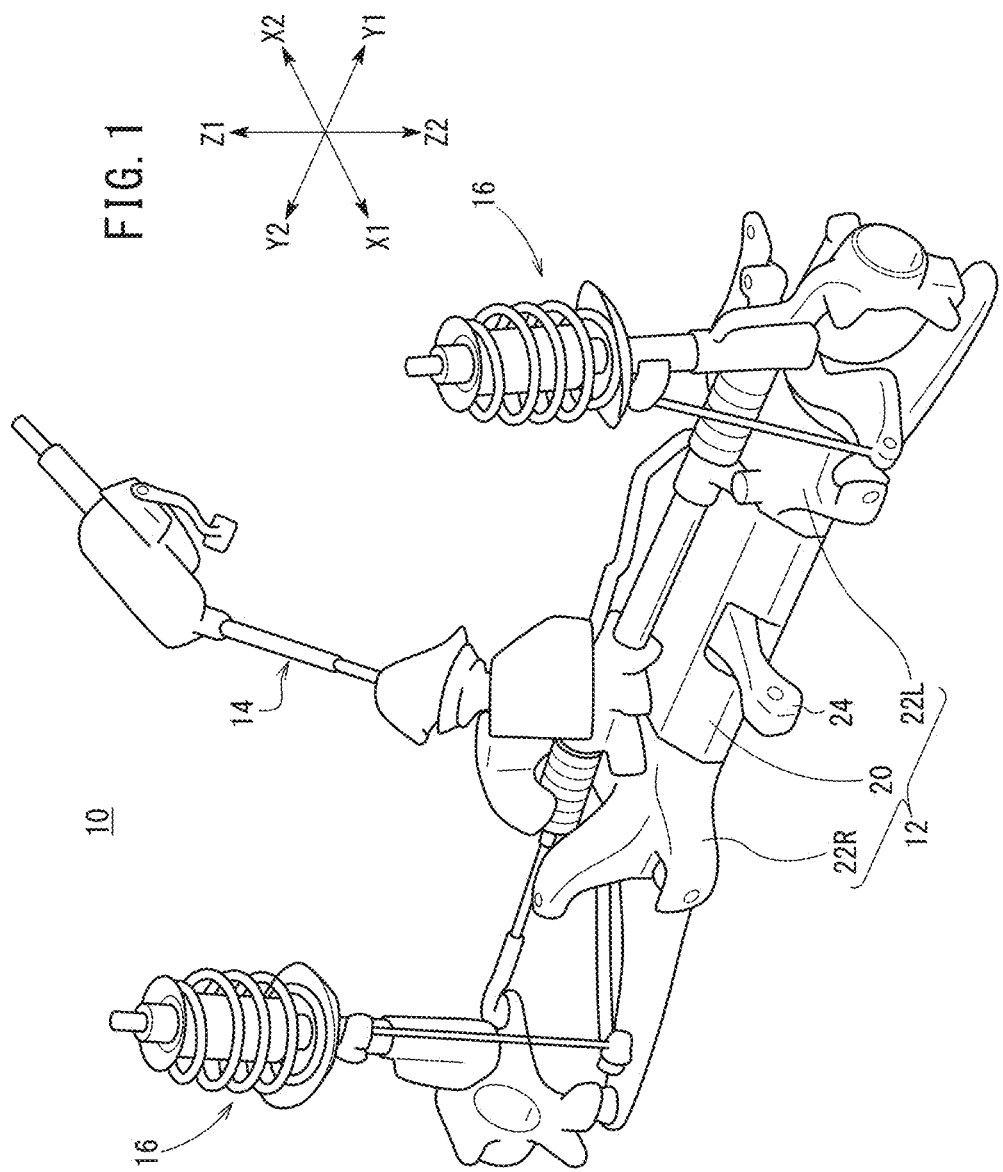
FIG. 1 is a perspective view (front view-plan view-left side perspective view) showing part of a vehicle on which a subframe as a bonded structure according to an embodiment of the present invention is mounted.
Figure 2:
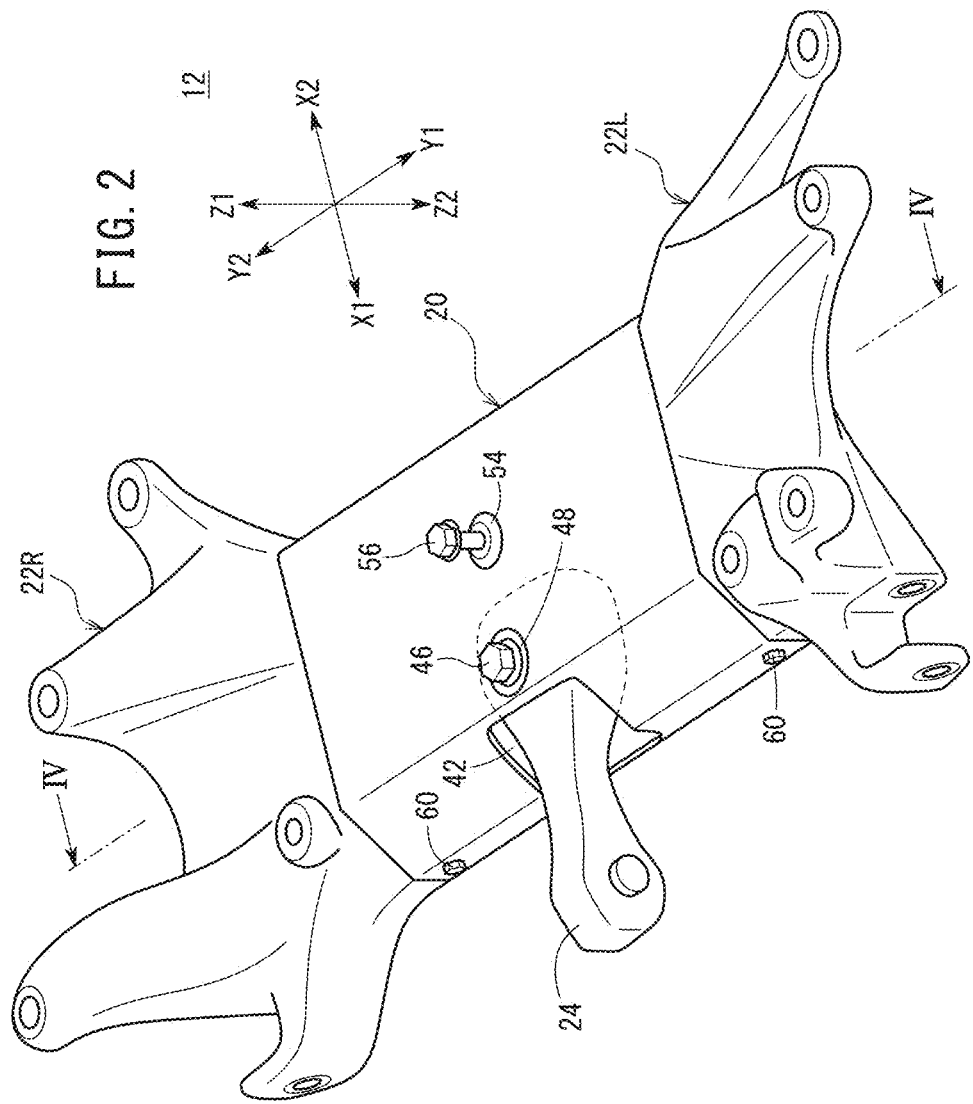
FIG. 2 is a perspective view (front view-plan view-left side perspective view) of the subframe.
Figure 3:
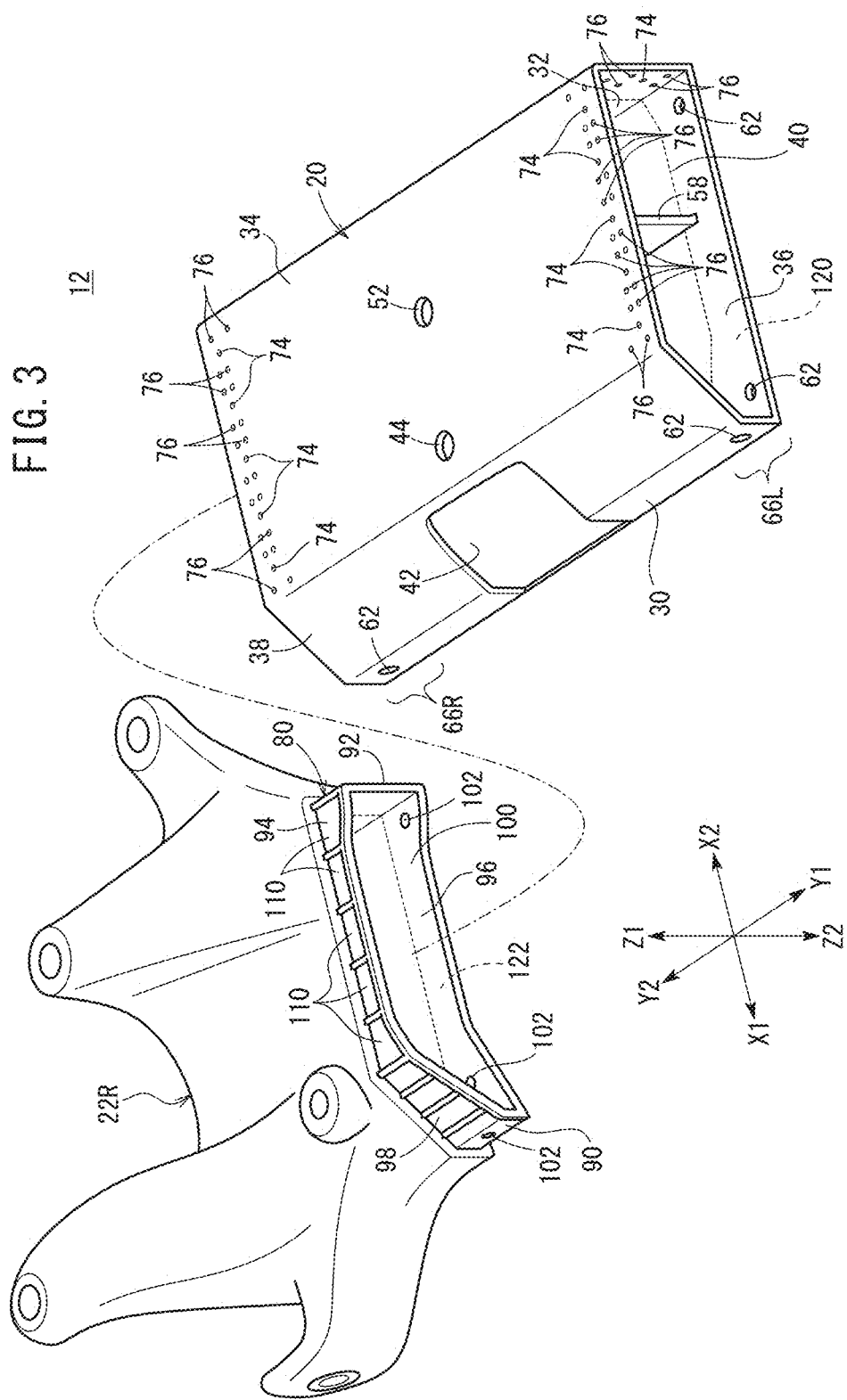
FIG. 3 is an exploded perspective view (front view-plan view-left side exploded view) of part of the subframe.

A bonded structure according to an embodiment of the present invention will be described with reference to FIGS. 1 to 3. The bonded structure described below is a subframe 12 mounted on a vehicle 10. As described later, the subframe 12 is a bonded structure containing different members, i.e., metal members (side brackets 22L, 22R) and a fiber-reinforced plastic member (center beam 20), which are bonded to each other with an adhesive. In FIGS. 1 to 3, arrows X1, X2, Y1, Y2, Z1, Z2 indicate directions based on the vehicle 10. More specifically, the arrows X1, X2 indicate forward and backward directions of the vehicle 10. The arrows Y1, Y2 indicate a width direction (lateral direction) of the vehicle 10. The arrows Z1, Z2 indicate a height direction (vertical direction) of the vehicle 10. Further, in FIG. 3, although the left bracket 22L is omitted, the left bracket 22L has a symmetrical configuration with respect to the right bracket 22R.

As shown in FIG. 1, the vehicle 10 includes, in addition to the subframe 12, a steering mechanism 14 that changes angles of unillustrated front wheels according to an operation of an unillustrated steering member, and a suspension 16.

The subframe 12 supports an unillustrated engine, the steering mechanism 14 and the suspension 16. For example, a configuration disclosed in Japanese Laid-Open Patent Publication No. 2009-096370 is applicable to a relationship between the subframe 12 and parts around the subframe 12.

As shown in FIG. 2, the subframe 12 includes the center beam 20, which is the fiber-reinforced plastic member disposed at the center, and the left bracket 22L and the right bracket 22R (also referred to as the "side brackets 22L, 22R" below), which are the metal members disposed on the left and the right sides of the center beam 20. As described below, the center beam 20 and the side brackets 22L, 22R are adhesively bonded to each other with an adhesive 130 (FIG. 4) containing, for example, an epoxy resin as main component, and are also fixed to each other at a plurality of portions with bolts 60.

2. Configuration of Center Beam 20

The center beam 20 supports the engine (not shown) via a support rod 24 (FIG. 1, etc.), and is made of carbon-fiber-reinforced plastic (CFRP) in the present embodiment.

As shown in FIG. 3, the center beam 20 is a hollow member made up of a front surface portion 30, a back surface portion 32, a top surface portion 34 and a bottom surface portion 36, and basically has a rectangular cross-sectional shape. Further, the center beam 20 includes at a front side an inclined portion 38 that inclines downward from the top surface portion 34 toward the front surface portion 30. Hence, the center beam 20 has a closed cross-sectional structure portion (second closed cross-sectional structure portion) having a closed cross-sectional shape, and includes opening portions 40 formed on the left and the right sides.

A rod opening portion 42 is formed so as to extend from the front surface portion 30 to the inclined portion 38, and allows insertion of the support rod 24 therein. Bolt holes 44 are formed in the top surface portion 34 and the bottom surface portion 36, and are used to fix a rod support bolt 46 (FIG. 2) that supports the support rod 24. Nut members 48 (FIG. 2) for fixing the rod support bolt 46 are fixed with an adhesive or the like at and around the bolt holes 44.

A fixing hole 52 is formed in the top surface portion 34, and is used to fix part of the steering mechanism 14 (gear box). A nut member 54 (FIG. 2) is fixed by an adhesive or the like at and around the fixing hole 52, and fixes a bolt 56 for fixing the gear box.

A rib 58 is formed between the top surface portion 34 and the bottom surface portion 36, in order to enhance the strength of the center beam 20.

Structures to be bonded to the side brackets 22L, 22R by using the plurality of bolts 60 and the adhesive 130 are arranged on the front surface portion 30, the back surface portion 32, the top surface portion 34 and the bottom surface portion 36 of the center beam 20. More specifically, through-holes 62 are formed in the front surface portion 30 and the bottom surface portion 36, and allow insertion of the bolts 60 therein.

End portions 66L, 66R of the center beam 20 correspond to the above second closed cross-sectional structure portions. In the back surface portion 32 and the top surface portion 34 of each of the end portions 66L, 66R of the center beam 20, injection ports 74 for injecting the adhesive 130, and confirmation holes 76 for confirming a degree of injection or filling of the adhesive 130 are formed. Each injection port 74 is located at the center of the four confirmation holes 76 arranged therearound. The number of the injection ports 74 and the number of the confirmation holes 76 are not limited to the above, and can be optionally selected according to factors such as positions and shapes of areas in which the adhesive 130 needs to be injected. In FIGS. 1 and 2, the injection ports 74 and the confirmation holes 76 are omitted.

3. Configuration of Side Brackets 22L, 22R

The side brackets 22L, 22R are fixed to a main frame (not shown) of the vehicle 10 so that the entire subframe 12 is supported on the main frame. Further, the side brackets 22L, 22R support the steering mechanism 14 and the suspension 16 as shown in FIG. 1. The side brackets 22L, 22R in the present embodiment are hollow members made of aluminum, and castings molded by casting.

As shown in FIG. 3, each of the side brackets 22L, 22R contains, on a side of the center beam 20, a bracket bonded portion 80 (also referred to as the "bonded portion 80" below) which is used to be bonded to the center beam 20.

The bonded portion 80 is a hollow member made up of a front surface portion 90, a back surface portion 92, a top surface portion 94 and a bottom surface portion 96, and basically has a rectangular cross-sectional shape. Further, the bonded portion 80 includes at the front side an inclined portion 98 that inclines downward from the top surface portion 94 toward the front surface portion 90. Hence, each of the side brackets 22L, 22R has a closed cross-sectional structure portion (first closed cross-sectional structure portion) of a closed cross section, and includes an opening portion 100 formed on the center beam 20 side.

The bonded portion 80 corresponds to the first closed cross-sectional structure portion. The cross-sectional shape of the bonded portion 80 is substantially similar to the cross-sectional shape of the center beam 20. An outer circumference of the bracket bonded portion 80 is slightly smaller than an inner circumference of the center beam 20. Hence, the end portions 66L, 66R of the center beam 20 can be externally fitted onto the bonded portions 80 of the side brackets 22L, 22R. That is, the center beam 20 and the side brackets 22L, 22R jointly form a socket-and-spigot structure in which the first closed cross-sectional structure portions of the side brackets 22L, 22R are disposed inside the second closed cross-sectional structure portions of the center beam 20, and outer circumferential surfaces of the first closed cross-sectional structure portions and inner circumferential surfaces of the second closed cross-sectional structure portions face toward each other.

As shown in FIG. 3, the widths (the lengths in the lateral direction Y1, Y2) at front portions of the top surface portion 94, the bottom surface portion 96 and the inclined portion 98 increase toward the front side. Thus, it is possible to increase a bonded area by the adhesive 130, and enhance bonding strength. Further, the widths of ends of rear portions of the top surface portion 94 and the bottom surface portion 96 are wide. Consequently, it is possible to increase the bonded area by the adhesive 130 on the back surface side, and enhance bonding strength.

Structures to be bonded to the center beam 20 by using the bolts 60 and the adhesive 130 are arranged on the front surface portions 90, the back surface portions 92, the top surface portions 94 and the bottom surface portions 96 of the side brackets 22L, 22R. More specifically, through-holes 102 are formed in the front surface portions 90 and the bottom surface portions 96, and allow insertion of the bolts 60 therein. Recesses 110 for guiding the adhesive 130 are formed in the top surface portion 94. Although not shown, the recesses 110 are also formed in the back surface portion 92.

In this description, portions at which the center beam 20 and the side brackets 22L, 22R are bonded are defined as follows. That is, surfaces (inner surfaces) of the front surface portion 30, the back surface portion 32, the top surface portion 34, the bottom surface portion 36 and the inclined portion 38 of the center beam 20 that are bonded to the side brackets 22L, 22R are referred to as beam-side bonded surfaces 120. Outer surfaces of the front surface portions 90, the back surface portion 92, the top surface portions 94, the bottom surface portions 96, and the inclined portions 98 of the side brackets 22L, 22R are referred to as bracket-side bonded surfaces 122.

Figure 4:
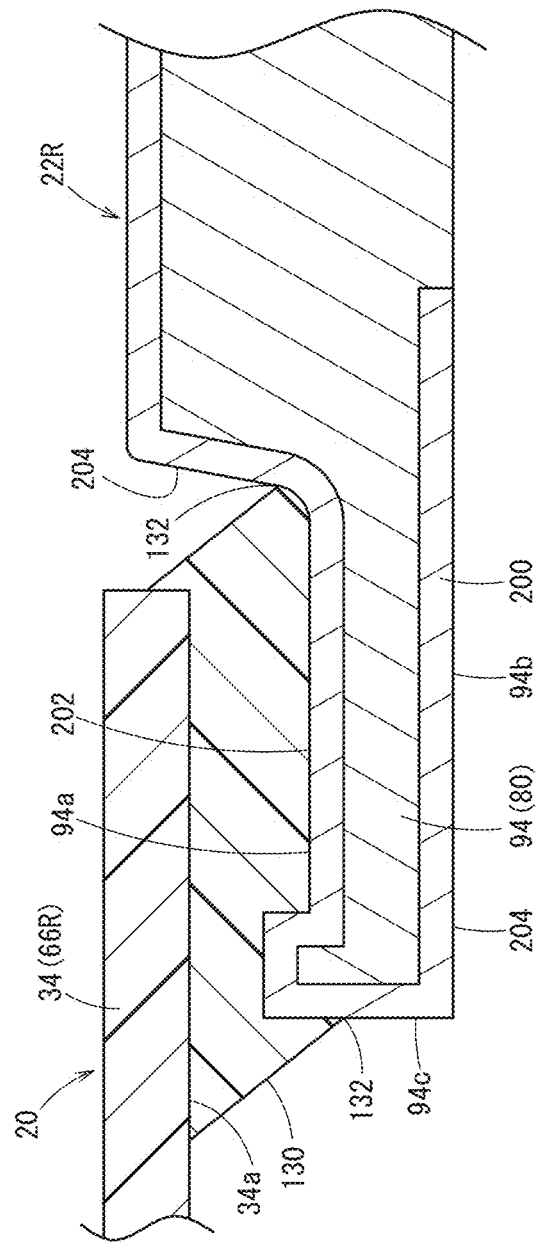
FIG. 4 is a schematic view taken along line IV-IV in FIG. 2.

Each of the beam-side bonded surfaces 120 includes a fiber-reinforced-plastic side bonded surface to which the adhesive 130 is applied, i.e., a bonded surface 34a (FIG. 4). Each of the bracket-side bonded surfaces 122 includes a metal member side bonded surface to which the adhesive 130 is applied, i.e., a bonded surface 202 (FIG. 4). In the present embodiment, an amorphous structure layer 200 is formed on a surface layer of the bracket-side bonded surface 122.

4. Amorphous Structure Layer 200

The outer circumferential surfaces of the bonded portions 80 of the side brackets 22L, 22R and the inner circumferential surfaces of the end portions 66L, 66R of the center beam 20 are adhesively bonded. FIG. 4 shows a bonded area of the top surface portion 94 and the top surface portion 34 among the bonded areas of the bonded portion 80 of the right bracket 22R and the end portion 66R of the center beam 20.

As shown in FIG. 4, the amorphous structure layer 200 having a predetermined thickness is formed on the entire surface layer of the top surface portion 94, i.e., a surface layer including a first surface 94a corresponding to the outer circumferential surface of the bonded portion 80, a surface layer including a second surface 94b corresponding to the inner circumferential surface of the bonded portion 80 and the surface layer including a third surface 94c corresponding to an end surface of the bonded portion 80. The adhesive 130 is applied to part of the first surface 94a and part of the third surface 94c. The surface of the amorphous structure layer 200 is formed so as to cover the bonded surface 202 to which the adhesive 130 is applied, and a non-bonded surface 204 to which the adhesive 130 is not applied, and expands on an area wider than the bonded surface 202. In other words, an outer circumferential end portion 132 of the adhesive 130 adhering to the top surface portion 94 is disposed on the first surface 94a and the third surface 94c. In this state, the amorphous structure layer 200 is formed on the entire bonded surface 202 of the top surface portion 94. In the present embodiment, the amorphous structure layer 200 is also formed on the non-bonded surface 204 of the top surface portion 94 and an outer side of the top surface portion 94. The adhesive 130 is also applied to the bonded surface 34a of the top surface portion 34.

Although not shown, as with the top surface portion 94, the amorphous structure layer 200 is also formed on the front surface portion 90, the back surface portion 92, the bottom surface portion 96 and the inclined portion 98 of the right bracket 22R. A structure of the bonded area between the bonded portion 80 of the left bracket 22L, and the end portion 66L of the center beam 20 is also the same.

5. Reason that Amorphous Structure Layer 200 can Prevent Electrolytic Corrosion The amorphous structure layer 200 plays a role of preventing electrolytic corrosion of the metal member (the top surface portion 94 in the following description). This reason will be described with reference to FIGS. 5A and 5B. In this description, a top surface portion 94' (FIG. 5A) on which the amorphous structure layer 200 is not formed is assumed, and compared with the top surface portion 94 (FIG. 5B) on which the amorphous structure layer 200 is formed. As described above, the top surface portion 94' and the top surface portion 94 are metal members (aluminum). The metal members include grain boundaries 140.

Figure 5A:
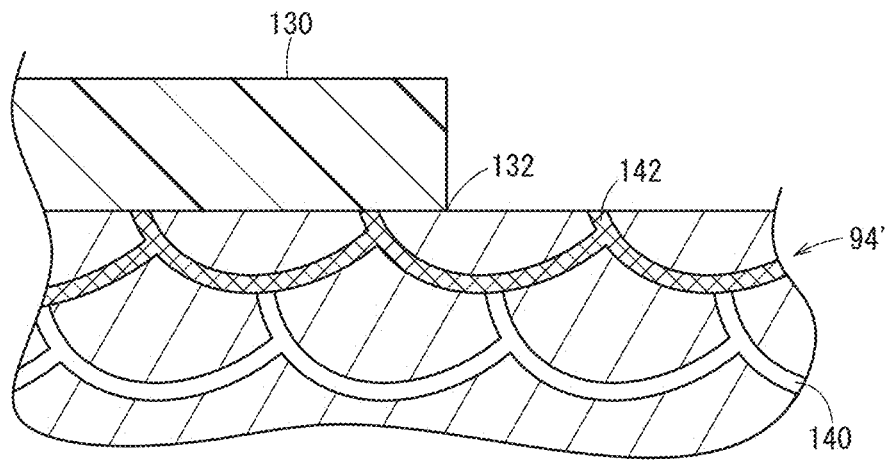
FIG. 5A is a schematic view of an interface between a metal member that does not include a grain boundary on a surface layer, and an outer circumferential end portion of an adhesive.

When the grain boundary 140 is exposed to outside air as in the top surface portion 94' shown in FIG. 5A, impurities existing along the grain boundary 140 serve as local cells and cause electrolytic corrosion 142 (shown as a cross hatching portion). The electrolytic corrosion 142 spreads along the grain boundary 140, and influence of the electrolytic corrosion 142 reaches surroundings of the outer circumferential end portion 132 of the adhesive 130. Then, the bonding strength of the adhesive 130 around the outer circumferential end portion 132 is lowered, and the adhesive 130 is readily peeled off the top surface portion 94'.

Figure 5B:
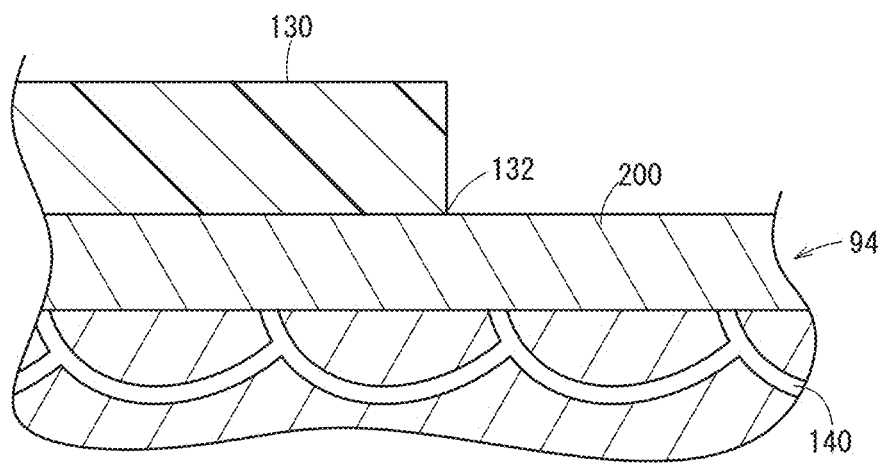
FIG. 5B is a schematic view of an interface between an amorphous structure layer that includes a grain boundary on a surface layer, and an outer circumferential end portion of an adhesive

When the amorphous structure layer 200 is formed on a surface layer including the surface of the top surface portion 94 shown in FIG. 5B, the grain boundary 140 of the top surface portion 94 is not exposed to outside air. This is because the amorphous structure layer 200 does not have a crystal structure. Thus, the grain boundary 140 is covered with the amorphous structure layer 200. Therefore, the electrolytic corrosion 142 does not occur in the grain boundary 140 disposed below the outer circumferential end portion 132 of the adhesive 130.

6. Modification of Amorphous Structure Layer 200 and Adhesive 130

As shown in FIG. 6, a surface of a surface layer 206 on which the amorphous structure layer 200 is not formed may be included in the bonded surface 202. When the adhesive 130 is applied to the surface layer 206, the surface layer 206 is not exposed to outside air. Hence, the electrolytic corrosion 142 (FIG. 5A) is not caused by the grain boundary 140 (FIGS. 5A and 5B) of the surface layer 206. When the amorphous structure layer 200 is formed around the surface of the surface layer 206, the electrolytic corrosion 142 does not intrude into the surface layer 206 from the surroundings.

Figure 7:
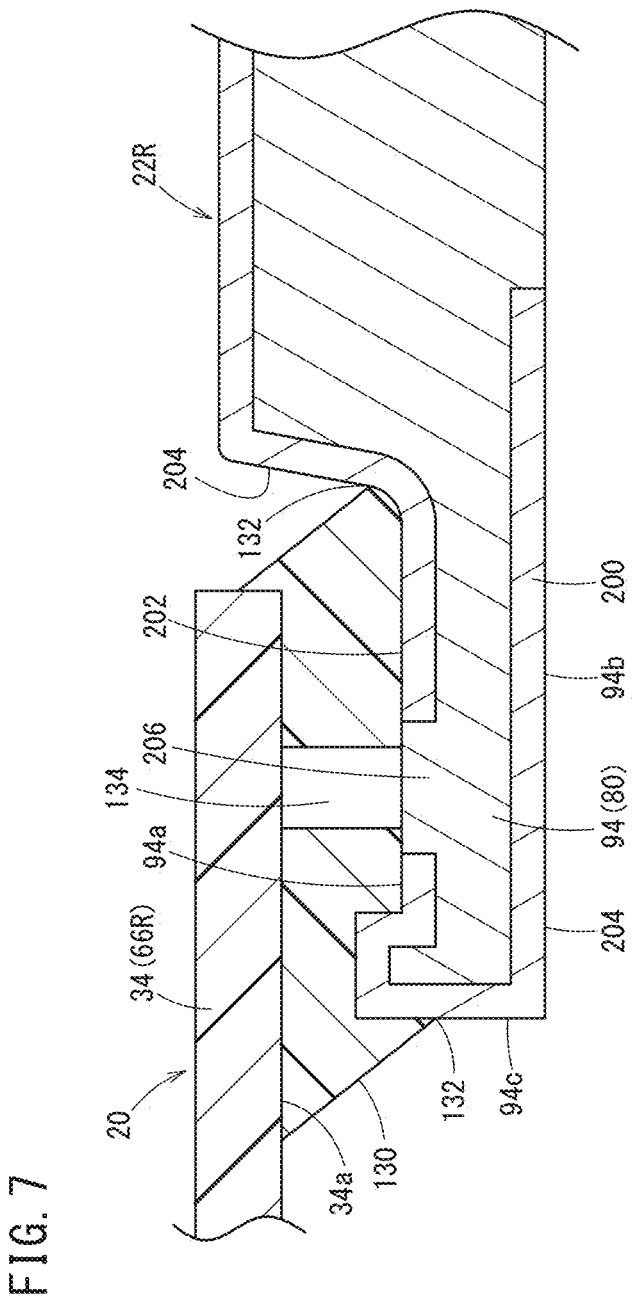
FIG. 7 is a schematic view of the modification of FIG. 4.

As shown in FIG. 7, a cavity 134 may be formed in the adhesive 130 on the surface layer 206. The cavity 134 is surrounded by the adhesive 130 (and the top surface portion 94 and the top surface portion 34), and is thereby shielded from the outside air. Hence, the electrolytic corrosion 142 is not caused by the grain boundary 140 of the surface layer 206 in contact with the cavity 134.

7. Bottomed Holes 212 of Amorphous Structure Layer 200

Figure 8:
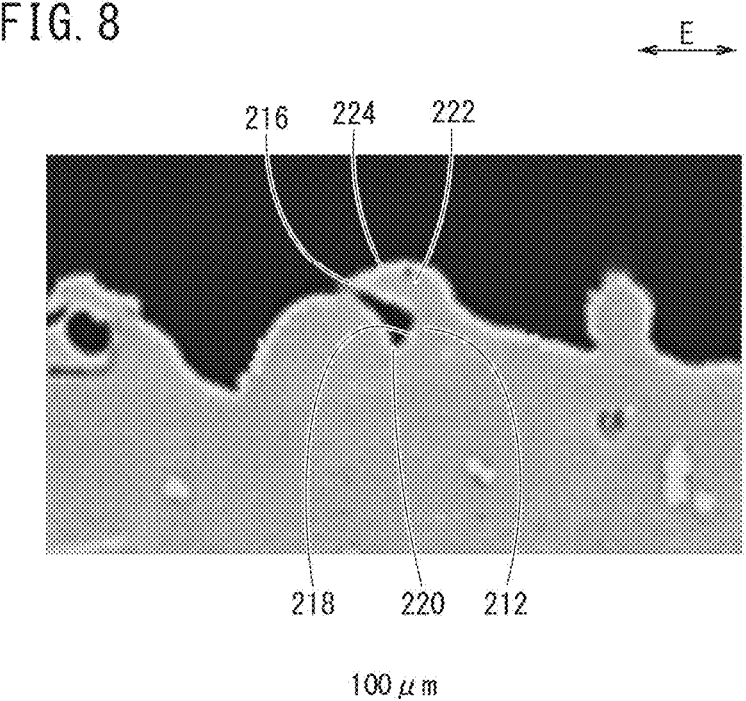
FIG. 8 is an image of a bottomed hole formed in a surface of the amorphous structure layer.

Irradiating the surface of the metal member (the top surface portion 94 in the following description) with laser light forms the amorphous structure layer 200 on the surface layer. The amorphous structure layer 200 has a surface roughness more than a predetermined level. A bottomed hole layer 214 (FIG. 9B) including a plurality of bottomed holes 212 shown in FIG. 8 is formed in the surface layer including the surface of the amorphous structure layer 200. FIG. 8 shows an image obtained by observing the bottomed hole layer 214 under a scanning electron microscope (SEM).

The bottomed hole 212 includes an opening portion 216 on the surface of the bottomed hole layer 214. A cross-sectional shape of the bottomed hole 212 in the depth direction has a reverse-tapered shape (i.e., a shape in which the bottom side is larger than the opening side) including a bulged portion 220 having a larger inner circumference than the opening portion 216, between the opening portion 216 and a bottom portion 218. Many of the bottomed holes have a reverse-tapered shape in which the inner circumference gradually expands from the opening portion 216 toward the bottom portion 218 so that the bottom portion 218 is formed as the bulged portion 220.

A hook portion 222 having an undercut shape is formed around the opening portion 216. The hook portion 222 includes a head portion 224 which extends in non-parallel to a direction E parallel to an extending surface of the metal member, i.e., is inclined with respect to the direction E. The opening portion 216 is formed at one end side of the head portion 224. The length of the head portion 224 is 100 μm or less.

8. Reason that Bottomed Hole Layer 214 Improves Bonding Strength

Figure 9A:
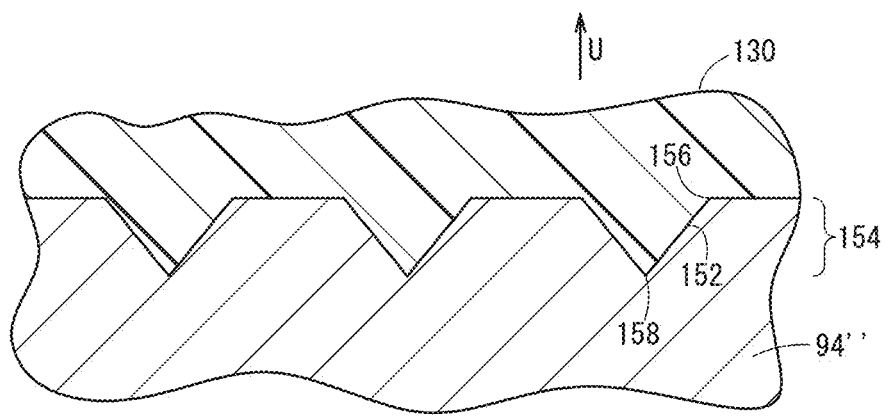
FIG. 9A is a schematic view of an interface between a machined metal member and an adhesive.
Figure 9B:
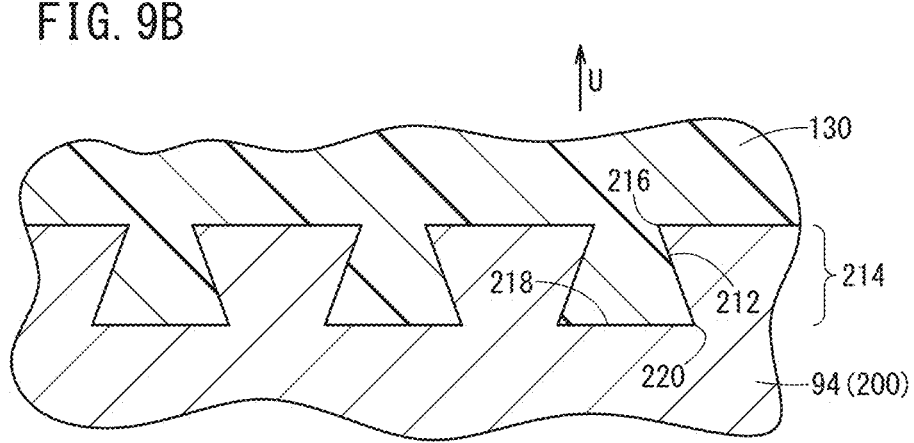
FIG. 9B is a schematic view of an interface between an amorphous structure layer and an adhesive.

The bottomed hole layer 214 plays a role of improving the bonding strength of the adhesive 130. This reason will be described with reference to FIGS. 9A and 9B. In this description, a top surface portion 94" (FIG. 9A) having a machined surface is assumed, and compared with the top surface portion 94 (FIG. 9B) with the bottomed hole layer 214 formed on the surface layer of the amorphous structure layer 200. FIG. 9A schematically shows a cross section of the top surface portion 94". FIG. 9B schematically shows the cross section of the top surface portion 94.

As shown in FIG. 9A, a bottomed hole layer 154 with a plurality of bottomed holes 152 is formed in a surface layer including the surface of the top surface portion 94". The bottomed hole 152 has a shape (tapered shape) whose inner circumference gradually narrows from an opening portion 156 toward a bottom portion 158. The bottomed holes 152 are formed in the bottomed hole layer 154, so that the bottomed hole layer 154 has a larger surface area, and exhibits an anchor effect. Consequently, the bonding strength of the adhesive 130 becomes higher. However, the tapered shapes of the bottomed holes 152 have a low resistance against a force that acts on the adhesive 130, with which the bottomed holes 152 are filled, in a direction U away from the top surface portion 94".

By contrast with this, the reverse-tapered shapes of the bottomed holes 212 shown in FIG. 9B have a high resistance against a force that acts on the adhesive 130, with which the bottomed holes 212 are filled, in the direction U away from the top surface portion 94. Further, the hook portions 222 of undercut shapes located around the opening portions 216 enhance the resistance. Consequently, the bottomed holes 212 having the reverse-tapered shapes can have higher adhering and bonding strength than the bottomed holes 152 having the tapered shapes.

9. Method of Manufacturing Subframe 12 (Bonded Structure)

Before the center beam 20 and the side brackets 22L, 22R are bonded, the surfaces of the bonded portions 80 of the side brackets 22L, 22R are irradiated with a laser. Conditions such as an intensity and an irradiation time of laser are set according to the thickness and an area of the amorphous structure layer 200. After the irradiation of the laser, the bonded portions 80 are cooled. The amorphous structure layer 200 is formed on each surface of the cooled bonded portion 80. Further, the bottomed hole layer 214 is formed on the surface layer of the amorphous structure layer 200. The bonded portion 80 can be cooled by natural cooling such as air cooling, or forced cooling such as use of an arbitrary cooling device.

Next, the adhesive 130 is applied to the bonded portions of the center beam 20 and the side brackets 22L, 22R, i.e., the beam-side bonded surface 120 and the bracket-side bonded surface 122 (FIG. 3). When the adhesive 130 is applied to the bracket-side bonded surface 122, a pressure is applied to the adhesive 130 in order to fill the bottomed holes 212 with the adhesive 130.

Next, the bonded portions 80 of the side brackets 22L, 22R are fitted into the end portions 66L, 66R of the center beam 20. The surface of the bottomed hole layer 214 formed on the surface layer of the bracket-side bonded surface 122, and the beam-side bonded surface 120 are arranged in facing relation to each other with the adhesive 130 interposed therebetween, and the bracket-side bonded surface 122 and the beam-side bonded surface 120 are bonded together. In this case, the outer circumferential end portion 132 of the adhesive 130 is disposed on the surface of the amorphous structure layer 200 (bottomed hole layer 214).

Next, the bolts 60 are screwed and tightened into the through-holes 62 of the center beam 20 and the through-holes 102 of the side brackets 22L, 22R to thereby adjust the thickness of the adhesive 130. The adhesive 130 is injected through the injection ports 74 of the center beam 20.

A manufacturing method disclosed in Japanese Laid-Open Patent Publication No. 2014-128986 is applicable except formation of the amorphous structure layer 200.

10. Modifications

In the present embodiment, the subframe 12 that is a bonded structure has been described. However, the present invention can be also used for another structure containing the metal members and the fiber-reinforced plastic member adhesively bonded together. The present invention can be also used for an adhesively bonded portion of another structure that does not adopt the socket-and-spigot structure. Alternatively, one of an inner member and an outer member of the socket-and-spigot structure may be a metal member.

In the present embodiment, the bonded structure (center beam 20) containing the metal members (side brackets 22L, 22R) and the fiber-reinforced plastic member (center beam 20) adhesively bonded together has been described. However, the bonded structure to which the present invention is applicable is not limited to a bonded structure containing the metal members and the fiber-reinforced plastic member that are bonded to each other by an adhesive. At least one of the first member and the second member may be the metal member. For example, the present invention is applicable to bonded structures containing metal members and a glass (ceramic) member, or metal members and a plastic member, or metal members and a rubber member, or the like. A sealing member may be used instead of an adhesive.

As the sealing member, generally used members such as acrylic, urethane, polyurethane, silicone, modified silicone, oil caulking and polysulphide members can be used.

11. Summary of Present Embodiment

In the subframe 12 (bonded structure) according to the present embodiment, the amorphous structure layer 200 is formed on the surface layer of the bonded portion 80 of each of the side brackets 22L, 22R (metal members). Further, the bottomed hole layer 214 including the plurality of bottomed holes 212 is formed on the surface layer of the amorphous structure layer 200. The bottomed hole 212 has the reverse-tapered shape, which has, between the opening portion 216 and the bottom portion 218, the bulged portion 220 having the larger inner circumference than the opening portion 216. The bottomed holes 212 are filled with the adhesive 130. The surface of the bottomed hole layer 214, i.e., the outer circumferential surface of the bonded portion 80 of each of the side brackets 22L, 22R and the inner circumferential surface of the end portion 66R of the center beam 20 (fiber-reinforced plastic member) face toward each other with the adhesive 130 interposed therebetween.

Corrosion (rust) does not occur in the interface between the amorphous structure layer 200 and the adhesive 130. Consequently, it is possible to realize a rust-prevention function. Since the bottomed holes 212 are formed in the surface layer of the amorphous structure layer 200, surface areas of the side brackets 22L, 22R, which are the metal members, become larger. Further, the bottomed holes 212 having the reverse-tapered shapes not only provide the anchor effect but also prevent running-off of the adhesive 130 from the bottomed holes 212. Consequently, it is possible to improve the adhesion strength between the side brackets 22L, 22R and the adhesive 130.

The bottomed hole 212 includes the hook portion 222 at the opening portion 216. The hook portion 222 has the undercut shape, and prevents running-off of the adhesive 130 from the bottomed hole 212. Consequently, it is possible to improve the adhesion strength between the side brackets 22L, 22R and the adhesive 130.

The hook portion 222 includes the head portion 224 which extends in non-parallel to the direction E parallel to the extending surface of each of the side brackets 22L, 22R, which are the metal members, the head portion 224 having a length of 100 μm or less. Since the head portion 224 extends in non-parallel to the direction E parallel to the extending surface of each of the side brackets 22L, 22R, the adhesive 130 is further prevented from running off the bottomed holes 212. Thus, it is possible to improve the adhesion strength between the side brackets 22L, 22R and the adhesive 130.

A method of manufacturing the subframe 12 (bonded structure) according to the present embodiment includes irradiating each of the side brackets 22L, 22R (metal members) with laser to thereby form the amorphous structure layer 200 on the surface layer of the bonded portion 80 of each of the side brackets 22L, 22R and form the bottomed hole layer 214 including the plurality of bottomed holes 212 in the surface layer of the amorphous structure layer 200. Each of the bottomed holes 212 has a reverse-tapered shape which has, between the opening portion 216 and the bottom portion 218, the bulged portion 220 having the larger inner circumference than the opening portion 216. The adhesive 130 is injected into the bottomed holes 212. The surface of the bottomed hole layer 214, i.e., the outer circumferential surface of the bonded portion 80 of each of the side brackets 22L, 22R and the inner circumferential surface of the end portion 66R of the center beam 20 (fiber-reinforced plastic member) are arranged so as to face toward each other with the adhesive 130 interposed therebetween, and the side brackets 22L, 22R and the center beam 20 are bonded together.

While the invention has been particularly shown and described with reference to a preferred embodiment, it will be understood that variations and modifications can be effected thereto by those skilled in the art without departing from the scope of the invention as defined by the appended claims.

What is claimed is:

1. A bonded structure containing a metal member and a fiber-reinforced plastic member bonded to each other with an adhesive, wherein:
    an amorphous structure layer is formed on a surface layer of the metal member;
    a bottomed hole layer including a plurality of bottomed holes is further formed on a surface layer of the amorphous structure layer;
    each of the bottomed holes has a reverse-tapered shape, wherein the reverse-tapered shape has, between an opening portion of each of the bottomed holes and a bottom portion thereof, a bulged portion having a larger inner circumference than the opening portion;
    the amorphous structure layer on the surface layer of the metal member and the bottomed hole layer including the plurality of bottomed holes on the surface layer of the amorphous structure layer are formed by irradiating the metal member with laser;
    the adhesive is injected in the bottomed holes; and
    a surface of the bottomed hole layer and a bonded surface of the fiber-reinforced plastic member face toward each other with the adhesive interposed therebetween.

2. The bonded structure according to claim 1, wherein each of the bottomed holes includes a hook portion at the opening portion.

3. The bonded structure according to claim 2, wherein the hook portion includes a head portion, and the head portion extends in non-parallel to an extending surface of the metal member and has a length of 100 µm or less.

4. A method of manufacturing a bonded structure that contains a metal member and a fiber-reinforced plastic member bonded to each other with an adhesive, the method comprising:
    irradiating the metal member with laser to thereby form an amorphous structure layer on a surface layer of the metal member and form a bottomed hole layer including a plurality of bottomed holes on a surface layer of the amorphous structure layer, each of the bottomed holes having a reverse-tapered shape, wherein the reverse-tapered shape has, between an opening portion of each of the bottomed holes and a bottom portion thereof, a bulged portion having a larger inner circumference than the opening portion;
    injecting the adhesive into the bottomed holes; and
    placing a surface of the bottomed hole layer and a bonded surface of the fiber-reinforced plastic member so as to face toward each other with the adhesive interposed therebetween, and bonding the metal member and the fiber-reinforced plastic member together.

5. A bonded structure containing a first member and a second member banded to each other with a sealing member, at least one of the first member and the second member being a metal member, wherein:
    an amorphous structure layer is formed on a surface layer of the metal member;
    a bottomed hole layer including a plurality of bottomed holes is further formed on a surface layer of the amorphous structure layer;
    each of the bottomed holes has a reverse-tapered shape, wherein the reverse-tapered shape has, between an opening portion of each of the bottomed holes and a bottom portion thereof, a bulged portion having a larger inner circumference than the opening portion;
    the amorphous structure layer on the surface layer of the metal member and the bottomed hole layer including the plurality of bottomed holes on the surface layer of the amorphous structure layer are formed by irradiating the metal member with laser;
    an adhesive is injected in the bottomed holes; and
    a surface of the bottomed hole layer and a bonded surface of the second member face toward each other with the sealing member interposed therebetween.

* * * * *